S. K. Baldwin,
Making Shoe Pegs.
No. 409. Reissued Nov. 4, 1856.
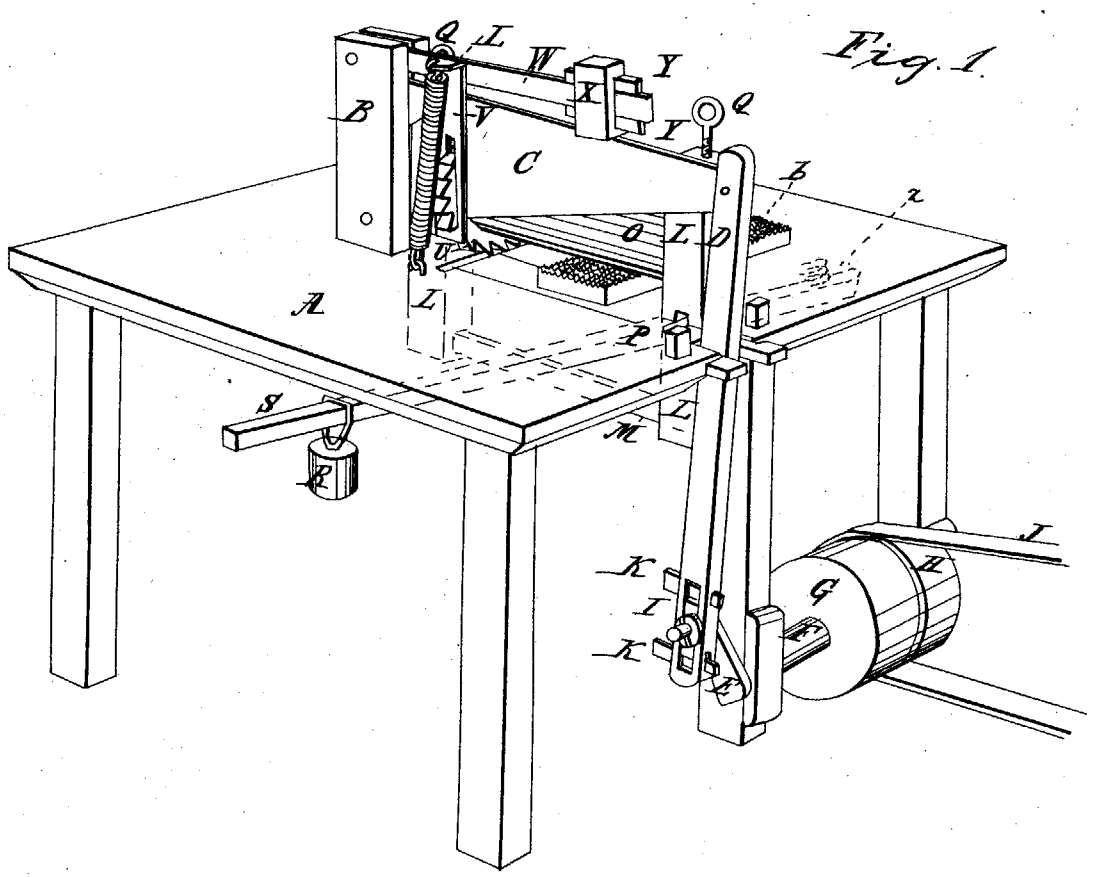
AM. PHOTO-LITHO. CO. N.Y. (OSBORNE'S PROCESS)

UNITED STATES PATENT OFFICE.

STEPHEN K. BALDWIN, OF GILFORD, NEW HAMPSHIRE.

IMPROVEMENT IN MACHINES FOR CUTTING SHOE-PEGS.

Specification forming part of Letters Patent No. 2,725, dated July 16, 1842; extended July 8, 1856; Re-issue No. 409, dated November 4, 1856.

*To all whom it may concern:*

Be it known that I, STEPHEN K. BALDWIN, of Gilford, in the county of Belknap and State of New Hampshire, have invented a new and useful Improvement in the Machine for Cutting Pegs, which is described as follows, reference being had to the annexed drawing of the same, making part of this specification.

The figure is a perspective view.

Similar letters refer to corresponding parts.

The bench or frame A, for supporting the several parts hereinafter described, and upon which the fluted block to be cut into pegs is placed, is made in the usual manner. A post, B, (to which one end of the knife for cutting the pegs and an arm resting on the back of the knife are attached,) is passed vertically through an aperture in the bench, being secured therein by keys or wedges, so that it can be raised or lowered at pleasure for the purpose of setting the end of the knife attached thereto higher or lower at pleasure. The shearing-knife C, for cutting the block into pegs, is made of steel tapered. It is attached to the post B by a bolt passed through it and a curved projection of the large end of the knife, and on which it moves or vibrates. The small end of the knife is attached to a whip-staff by a horizontal pin or bolt passed through them. The whip-staff D is made in the usual manner, and is attached by its lower end to the wrist of a crank, E, on the end of a revolving shaft, F, on which there is a fast pulley, G, and a loose pulley, H, of the usual form and construction. A sliding box, I, in which the wrist of the crank turns, is combined with the whip-staff near the lower end thereof, and is raised or lowered by keys K for the purpose of adjusting the depth of the stroke of the knife at pleasure, by increasing or diminishing the distance between the wrist and the knife. This sliding box is a rectangular block placed in a rectangular mortise in the whip-staff of the same width as the block, but greater length, so as to allow it sufficient play therein, having wedge-shaped keys inserted in said mortise at each end of the sliding box. The aperture in the box for the wrist is of the same diameter as the wrist.

The sliding frame, containing the fluted roller for holding down the fluted block or bolt upon the bench, and for drawing it forward to the knife, is composed of two vertical timbers, L L, which pass through mortises in the bench placed at the required distance apart and united by a horizontal transverse timber, M, mortised and tenoned into the same. The fluted roller O′ is made the length of the frame inside and of sufficient diameter, and turns on pivots or gudgeons in said frame. Mortises or slots are made in the vertical sides of said frame to permit them to rise and fall over horizontal plates P, secured across the openings in the bench in which the frame rises and falls. Two vertical screws, Q, for raising and lowering the frame, are inserted into the upper ends of the side pieces of the frame, extending down into the aforesaid mortises and resting upon the fixed horizontal plates P of the bench, crossing said mortises. When the frame is to be raised, the screws Q are turned to the right, and when it is to be lowered they are turned to the left, the weight of the frame and roller causing it to descend. A weight, R, may be attached to the lower cross-bar, M, of the frame, for holding down the roller upon the fluted bolt, or to one end of a lever, S, resting upon said cross-bar M, its other end bearing against a spiral spring (represented by dotted lines at Z) placed between it and the under side of the top of the bench A.

The machine is rendered self-feeding in the following manner: On one end of the fluted roller is fixed a toothed wheel, U, made like a circular saw. Over this wheel is arranged a reaching-arm, V, having an oblong mortise in the same, in which the toothed wheel turns. The upper end of this reaching-arm is attached to a vibrating bar or lever, W, one end of said bar or lever being attached to the head of the post B by a bolt, which will be the fulcrum, while its other end is passed through a mortise in a shifting block, X, which rests upon the back of the cutter C, said block X being made adjustable on said bar by keys or wedges Y, for the purpose of moving the block nearer to or farther from the fulcrum for increasing or diminishing the sweep or movement of the lever, and consequently that of the reaching-arm or toothed wheel. A spiral spring, *d*, is attached to the bench and to the reaching-arm for drawing down the latter.

Operation: A band, J, leading from the driving-power, being shifted from the loose pulley H to the fast pulley G, the machine will be put in motion, and as the crank-shaft F turns it raises the knife C by the whip-staff D, and at the same time the lever W and reaching-arm V, which turns the ratchet-wheel U and roller O, which feeds up the fluted bolt *b* as far as the required thickness of the peg to be cut, and the crank-shaft, continuing to revolve, brings down the knife C, makes a cut the thickness of the pegs, at the same time bringing down the reaching-arm V for a new hold on the toothed wheel, the arm slipping over the backs of the teeth, which are sloped downward to allow of this movement. In this manner the operation is continued until the bolt is cut in parallel cuts from one end to the other. The bolt is then turned round and cut at right angles to these former cuts in the same manner, which completes the operation. The bolt *b* is previously furrowed, grooved, or sawed in parallel lines at right angles in the manner that it is required to be cut up into pegs. The teeth or ribs of the roller enter the channels or grooves of the bolt previously sawed therein. If the blocks are intended for coarse or fine pegs, the grooves are made accordingly, and they form the points of the pegs; hence there must be a roller placed in the sliding frame, whose flutes correspond with the grooves on the block which the operator wishes to cut into pegs.

Instead of the vibrating knife C, a reciprocating knife or cutter may be substituted, which will not substantially alter the principle of my invention. Now,

What I claim, and desire to secure by Letters Patent, is—

The combination of the vibrating knife C, or its equivalent, with the fluted roller O, or its equivalent, operating in the manner above described.

STEPHEN K. BALDWIN.

Witnesses:

NATHL. EDGERLY,
NATHAN H. BALDWIN.